C. B. HASTINGS.
LOADING AND UNLOADING DEVICE FOR ENDLESS CARRIERS.
APPLICATION FILED SEPT. 1, 1916.
1,236,300.
Patented Aug. 7, 1917.
2 SHEETS—SHEET 1.
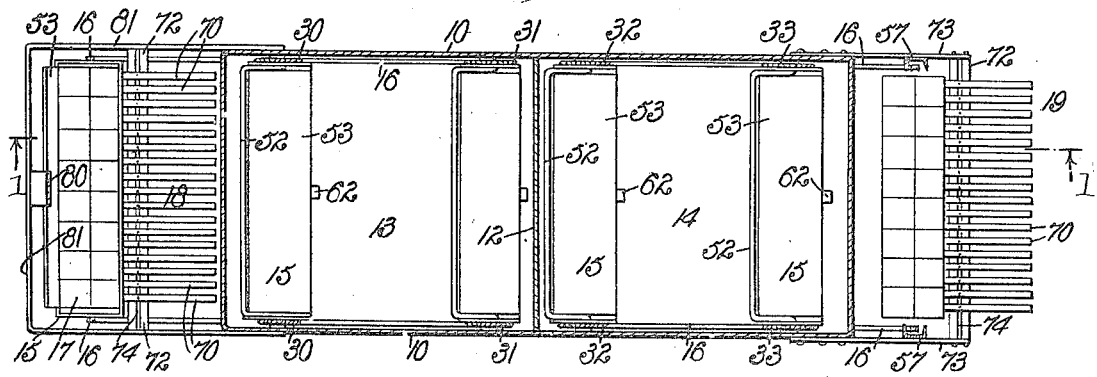
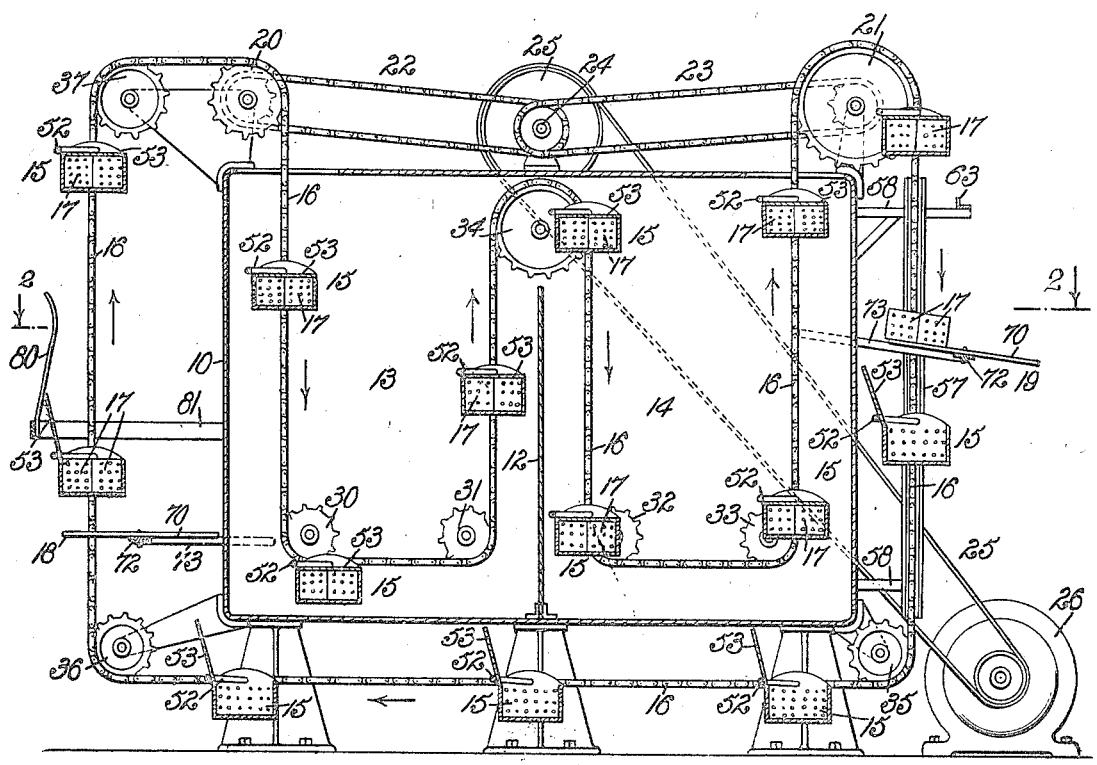
WITNESSES
Frederick Diehl.
INVENTOR
Charles B. Hastings
BY
ATTORNEYS

UNITED STATES PATENT OFFICE.

CHARLES B. HASTINGS, OF NEW YORK, N. Y.

LOADING AND UNLOADING DEVICE FOR ENDLESS CARRIERS.

1,236,300.  Specification of Letters Patent.  Patented Aug. 7, 1917.

Application filed September 1, 1916. Serial No. 118,029.

*To all whom it may concern:*

Be it known that I, CHARLES B. HASTINGS, a citizen of the United States, and a resident of the city of New York, borough of the Bronx, in the county of Bronx and State of New York, have invented a new and Improved Loading and Unloading Device for Endless Carriers, of which the following is a full, clear, and exact description.

The invention relates to apparatus for soaking and pasteurizing milk bottles and the like, and in which apparatus use is made of an endless carrier for carrying the bottles through the tank filled with a liquid.

The object of the invention is to provide a new and improved loading and unloading device for automatically placing the cases filled with the bottles into the carrier baskets, closing the covers thereof prior to the baskets entering the tank and finally removing the cases containing the sterilized bottles from the carrier after leaving the tank.

In order to accomplish the desired result, use is made of a tank, an endless carrier adapted to pass through the tank and to travel vertically outside of the tank on the loading and unloading sides thereof, baskets hung on the said carrier and having bottom and front slats, each of the front slats forming a continuation of a corresponding bottom slat, a loading table projecting into the path of the baskets at the loading side of the tank, and an unloading table projecting into the path of the baskets at the unloading side of the tank, said tables having slats in alternate relation with the slats of the baskets.

A practical embodiment of the invention is represented in the accompanying drawings forming a part of this specification, in which similar characters of reference indicate corresponding parts in all the views.

Figure 1 is a sectional side elevation of the loading and unloading device as supplied to the endless carrier of a soaking or a pasteurizing apparatus, the section being on the line 1—1 of Fig. 2;

Fig. 2 is a sectional plan view of the same on the line 2—2 of Fig. 1;

Figure 3:
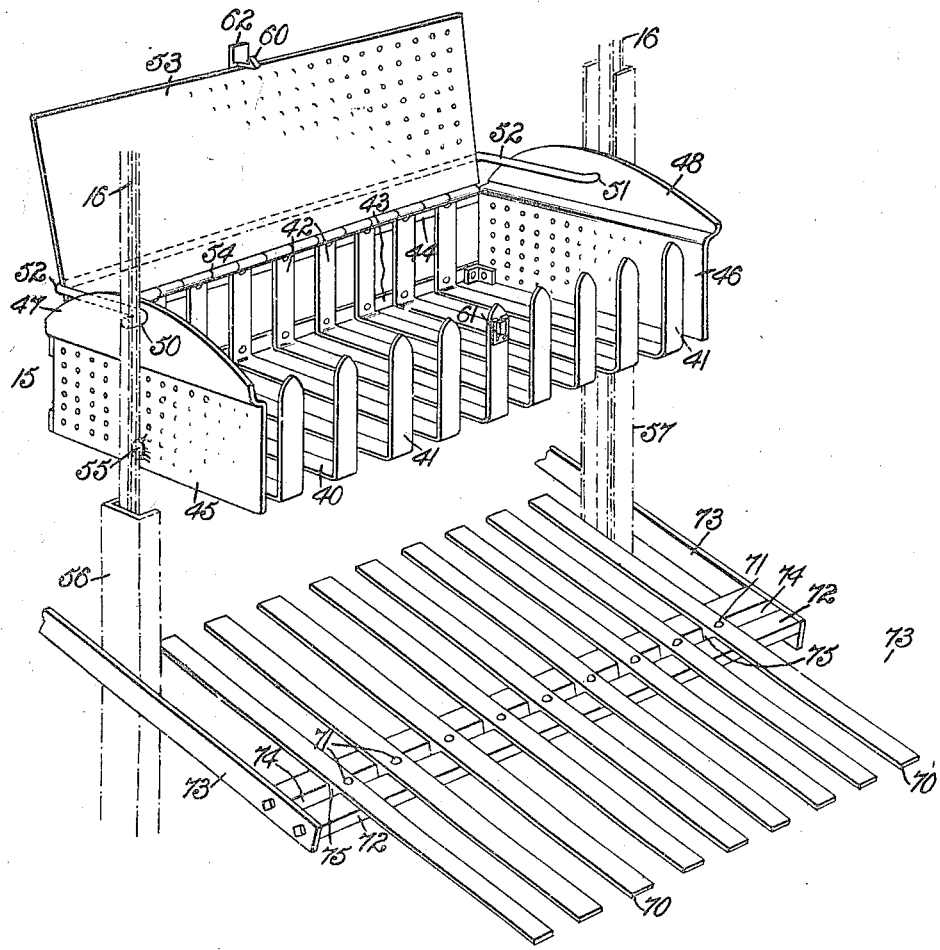
Fig. 3 is a perspective view of the unloading table and one of the baskets.
Figure 4:
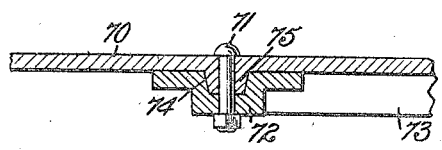
Fig. 4 is an enlarged sectional side elevation of one of the tables and its support.

The tank 10 of a soaking, pasteurizing or similar apparatus is filled with a suitable liquid and is preferably provided with a transverse partition 12 dividing the tank into two compartments 13 and 14 through which pass baskets 15 hung on endless carrier chains 16 and adapted to receive two cases 17 filled with bottles to be soaked, pasteurized or otherwise treated while passing through the liquid contained in the compartments 13 and 14.

In order to place the cases 17 containing the bottles into the baskets 15 use is made of a loading table 18, and in order to remove the cases 17 from the baskets 15 use is made of an unloading table 19, the said tables 18 and 19 being located outside of the tank 10 at the loading and unloading sides thereof, as plainly indicated in Figs. 1 and 2.

In order to impart a traveling motion to the endless carrier chains 16 in the direction indicated by the arrows shown in Fig. 1, use is made of driven sprocket wheels 20 and 21 journaled on the top of the tank 10 at opposite sides thereof, the said sprocket wheels 20 and 21 being driven by the sprocket wheel and sprocket chain connections 22 and 23 from a shaft 24 driven by suitable pulley and belt connection 25 from a motor 26. In order to guide the carrier chains 16 through the compartments 13 and 14, use is made of guide wheels 30 and 31 arranged in the compartment 13, and similar guide wheels 32, 33 arranged in the compartment 14, and guide wheels 34 arranged within the tank above the partition 12. The carrier chains 16 are caused to travel in a vertical direction on the outside of the tank 10 at the loading and unloading sides thereof, and for this purpose use is made of guide wheels 35, 36 and 37, of which the guide wheel 35 is located on the right-hand side of the tank 10 below the driven sprocket wheels 21, and the guide wheels 36 and 37 are located at the loading side of the tank, as plainly indicated in Fig. 1, so that the endless carrier chains travel vertically upward on the loading side of the tank, then through the compartments 13, 14 and vertically downward on the unloading side of the tank to pass under the bottom of the tank back to the loading side of the tank.

Figure 5:
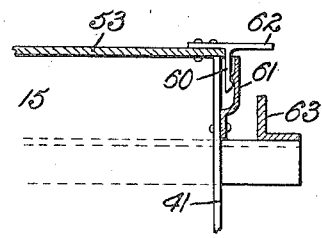
Fig. 5 is an enlarged sectional side elevation of the cover locking device and the means for unlocking it.

Each of the baskets 15 is formed of spaced bottom slats 40 terminating at their front ends in upwardly extending front slats 41 and terminating at their rear ends in upwardly extending back slats 42. The back slats 42 are attached to bottom and top crossbars 43, 44, to the ends of which are also secured end pieces 45 and 46 which are preferably made in the form of perforate plates, as plainly indicated in Fig. 3. The upper portions 47 and 48 of the end pieces 45 and 46 are bent outward and are engaged by trunnions 50 and 51 formed at the ends of a U-shaped bail 52 disposed horizontally and forming a stop for the cover 53 hinged at 54 to the upper crossbar 44 of the basket. The trunnions 50 and 51 are pivotally connected with the carrier chains 16 thus supporting the basket 15 on the said carrier chains and allowing the basket to maintain at all times an upright position during the travel of the carrier chains through and around the tank 10, as indicated in Fig. 1. The end pieces 45 are provided at their outer faces with lugs 55 located a distance below the trunnions 50 and 51, and the said lugs 55 are adapted to pass with the carrier chains 16 into channel guides 57 arranged on the unloading side of the tank 10 and supported therefrom by suitable brackets 58. The cover 53 is provided at its free end with a spring catch 60 adapted to engage a keeper 61 on the corresponding front slat 41 of the basket 15, and the said catch 60 is provided with an extension arm 62 (see Figs. 3 and 5) adapted to be engaged by a lug 63 attached to the upper bracket 58 to unlock the catch 60 from the keeper 61 at the time a basket descends on the unloading side of the tank 10.

Each of the tables 18 and 19 is formed of slats 70 spaced apart in alternate relation to the bottom and front slats 40, 41 of each basket 15. The slats 70 of the tables 18 and 19 are attached by bolts 71 to crossbars 72, fastened at their ends to brackets 73, of which the brackets 73 for the loading table 18 are attached to the tank 10 at the loading side thereof, and the brackets 73 for the slats 70 of the unloading table 19 are attached to the tank 10 on the unloading side thereof. The crossbar 72 is preferably provided with a transverse slot 74 into which fits a boss 75 formed on the under side of each slat 70 to securely hold the slat in position on the crossbar 72. The slats 70 are preferably made of double length to permit of reversing the slat in case one end is broken, it being understood that only one end of each slat is in active position at the time. The slats 70 of the loading table 18 are preferably disposed horizontally, while the slats of the unloading table 19 are inclined downwardly and outwardly to allow the cases 17 deposited thereon to slide downward onto an endless carrier for carrying the cases away from the machine.

In order to close the cover 53 of each basket 15 after the same is loaded with the cases 17 use is made of a spring 80 attached to a bracket 81 fastened to the tank 10 at the loading side thereof and projecting into the path of the free end of the cover 53. Thus when a basket 15 rises at the loading side of the tank then the cover 53 engages the spring 80 and the latter starts the cover to swing into closed position with the catch 60 finally engaging the keeper 61 to lock the cover in closed position on the basket.

The operation is as follows:

The cases 17 filled with bottles are delivered in pairs to the loading table 18 by the use of an endless belt or other means, and when a basket rises at the loading side the slats 40 and 41 of the basket pass between the slats 70, and the bottom slats 40 finally engage and lift the cases 17 thus carrying the cases along and through the liquid contained in the tank 10. It is understood that soon after the cases 17 are lifted off the loading table 18 by a basket 15, the cover 53 thereof is closed and locked as previously explained, and remains in closed and in locked position until the basket has passed through the tank and has reached the unloading side of the tank. It is understood that the baskets while being filled with cases 17 are moved through the liquid contained in the tank 10 so that the bottles in the cases are soaked or pasteurized, as the case may be.

When a basket 15 moves downward on the unloading side of the tank its cover is unlocked by the lug 63, and when the basket 15 reaches the unloading table 19 its bottom and front slats 40, 41 pass between the slats 70 of the unloading table 19 so that the cases 17 are held on the said slats while the basket keeps on descending thus leaving the cases on the table 19. It will be noticed that when the cases 17 are deposited on the table 19 and the carrier 15 keeps on moving downward then the cases 17 come in contact with the unlocked cover 53 whereby the latter is swung open and against the middle portion of the bail 52 which latter holds the cover in open position until the latter is closed on the loading side by the spring 80, as previously explained.

From the foregoing, it will be seen that the cases 17 containing the bottles to be soaked or pasteurized are automatically picked up by the baskets, carried through the liquid contained in the tank 10, and are deposited on the unloading table 19 without stopping the continuous travel of the endless carrier chains 16.

The loading and unloading device shown and described is very simple and can be readily applied to soaking, pasteurizing and other similar apparatus now generally used.

Having thus described my invention, I claim as new and desire to secure by Letters Patent:—

1. In a loading and unloading device, the combination of a tank, an endless carrier adapted to pass through the tank and to travel vertically outside of the tank on the loading and unloading sides thereof, baskets hung on the said carrier and having bottom and front slats, each of the front slats forming a continuation of a corresponding bottom slat, a loading table projecting into the path of the baskets at the loading side of the tank, an unloading table projecting into the path of the baskets at the unloading side of the tank, each of the said tables having slats of double length and arranged in alternate relation with the slats of the baskets, a support for the middle portion of the slats of each table, and means for detachably fastening the said middle portion of a slat to the support, whereby the slats may be turned end for end to project either end of a slat into the path of the basket.

2. In a loading and unloading device for endless carriers, a pair of endless carrier chains and a basket having its bottom, front and back formed of spaced slats, each front and back forming a continuation of a corresponding bottom slat, crossbars connecting the back slats with each other, end pieces attached to the said bars and having their upper portions bent outward, and a bail having its ends formed into trunnions extending through the said upper portions of the end pieces and engaging the said chains to support the basket on the chains.

3. In a loading and unloading device for endless carriers, a pair of endless carrier chains and a basket having its bottom, front and back formed of spaced slats, each front and back forming a continuation of a corresponding bottom slat, crossbars connecting the back slats with each other, end pieces attached to the said bars and having their upper portions bent outward, a bail having its ends formed into trunnions extending through the said upper portions of the end pieces and engaging the said chains to support the basket on the chains, and a cover hinged on the upper crossbar and adapted to rest against the said bail at the time the cover is open to support it in an approximately vertical position.

4. In a loading and unloading device for endless carriers, a pair of endless carrier chains, and a basket having its bottom, front and back formed of spaced slats, each front and back forming a continuation of a corresponding bottom slat, crossbars connecting the back slats with each other, end pieces attached to the said bars and having their upper portions bent outward, a bail having its ends formed into trunnions extending through the said upper portions of the end pieces and engaging the said chains to support the basket on the chains, a cover hinged on the upper crossbar and adapted to rest against the said bail at the time the cover is open, a spring catch on the free end of the said cover, a keeper on one of the front slats of the basket and adapted to be engaged by the said catch, and a fixed member at the unloading side of the tank and in the path of the said spring catch to disengage the latter from the keeper.

5. In a loading and unloading device for endless carriers, a pair of endless carrier chains and a basket having its bottom, front and back formed of spaced slats, each front and back slat forming a continuation of a corresponding bottom slat, crossbars connecting the back slats with each other, end pieces attached to the said bars and having their upper portions bent outward, a bail having its ends formed into trunnions extending through the said upper portions of the end pieces and engaging the said chains to support the basket on the chains, a cover hinged on the upper crossbar and adapted to rest against the said bail at the time the cover is open, and a fixed spring on the loading side of the tank and located above the loading table, the said spring being adapted to engage the said cover at the time the latter is open and the basket travels upward to swing the cover into closed position.

6. In a loading and unloading device for endless carriers, a pair of endless carrier chains and a basket having its bottom, front and back formed of spaced slats, each front and back forming a continuation of a corresponding bottom slat, crossbars connecting the back slats with each other, end pieces attached to the said bars and having their upper portions bent outward, a cover hinged to the upper cross bar, a bail having its ends formed into trunnions extending through the said upper portions of the end pieces and engaging the said chains to support the basket on the chains, the bail supporting the cover in an approximately vertical position, guide lugs on the said side pieces, and channel guides for guiding the endless chains at the unloading side of the tank, the said lugs being adapted to engage the said guides to hold the baskets against swinging movement during unloading.

7. In a loading and unloading device for endless carriers, a tank, an endless carrier passing through the tank and traveling vertically on opposite sides of the tank, slatted tables on opposite sides of the tank in the path of the carrier, a slatted basket hinged on the endless carrier and provided with a hinged cover and a spring latch for locking the cover closed, means for closing the cover after the basket has been loaded, and means for releasing the spring latch to permit the cover to be opened by the contents of the basket when the contents have been deposited on the table.

8. In a loading and unloading device for endless carriers, a tank, an endless carrier passing through the carrier and traveling vertically on opposite sides of the tank, a slatted table on the loading side of the tank, in the path of the carrier, a slatted basket hinged on the carrier and provided with a hinged cover, which when opened stands in approximately vertical position, and a spring member above the table and with which the cover of the basket engages to close the same.

9. In a loading and unloading device for endless carriers, a tank, an endless carrier passing through the tank and traveling vertically on opposite sides of the table, a slatted table on the unloading sides of the tank, a bracket above the table, and a slatted basket hinged on the carrier and provided with a hinged cover and a spring catch for the cover, said catch being provided with a projection extending into the path of the said bracket, whereby the cover will be unlatched before the basket reaches the table and then opened by the contents of the basket when deposited on the said table.

CHARLES B. HASTINGS.